J. R. EVANS AND F. H. G. BRANDT.
TENSION SPOOL.
APPLICATION FILED NOV. 25, 1916. RENEWED SEPT. 19, 1919.
1,333,069.
Patented Mar. 9, 1920.
2 SHEETS—SHEET 1.
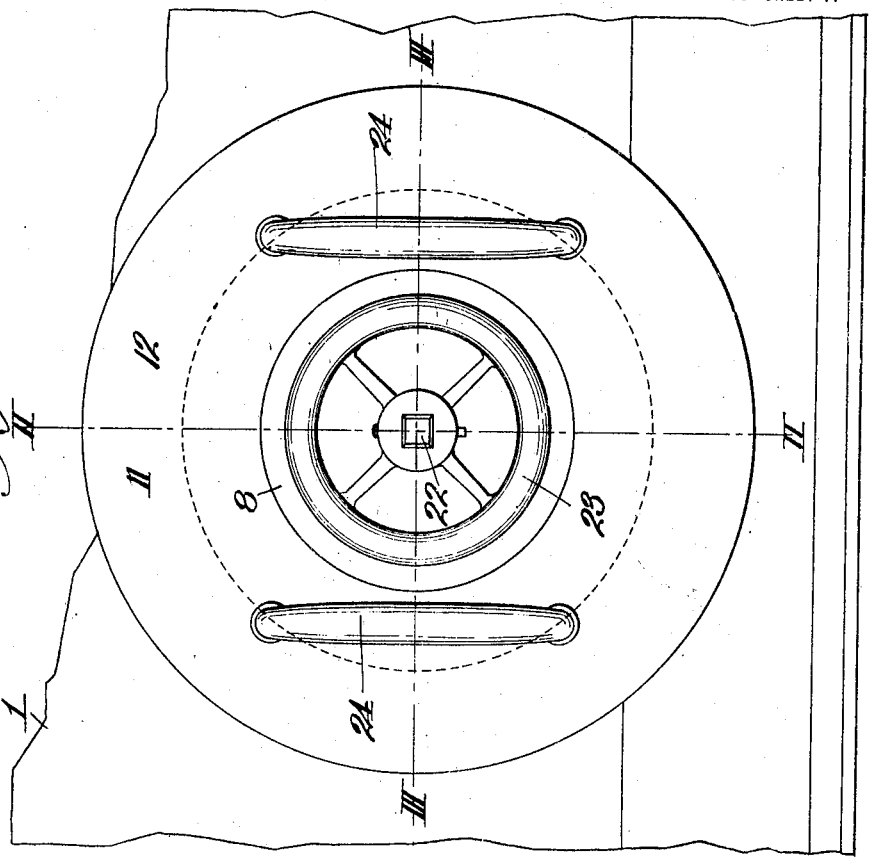
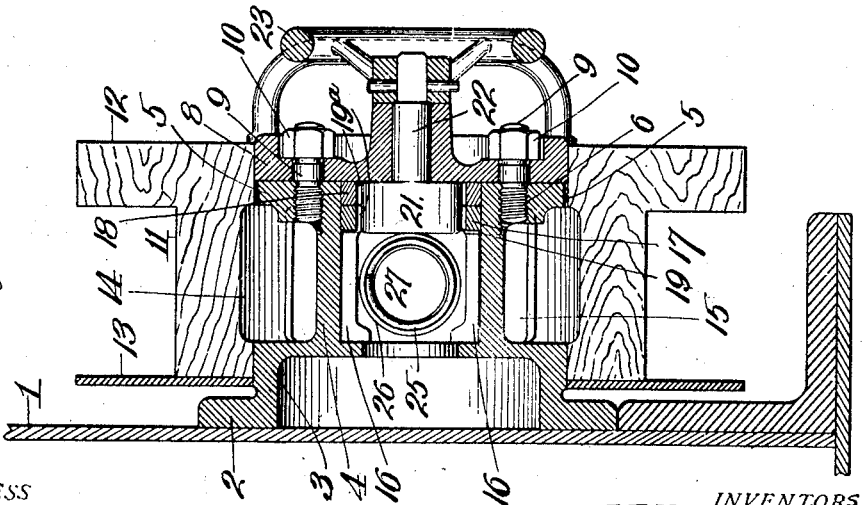
WITNESS
INVENTORS
J. R. Evans and
F. H. G. Brandt,
BY
ATTORNEY J. R. EVANS AND F. H. G. BRANDT.
TENSION SPOOL.
APPLICATION FILED NOV. 25, 1916. RENEWED SEPT. 19, 1919.
1,333,069.
Patented Mar. 9, 1920.
2 SHEETS—SHEET 2.
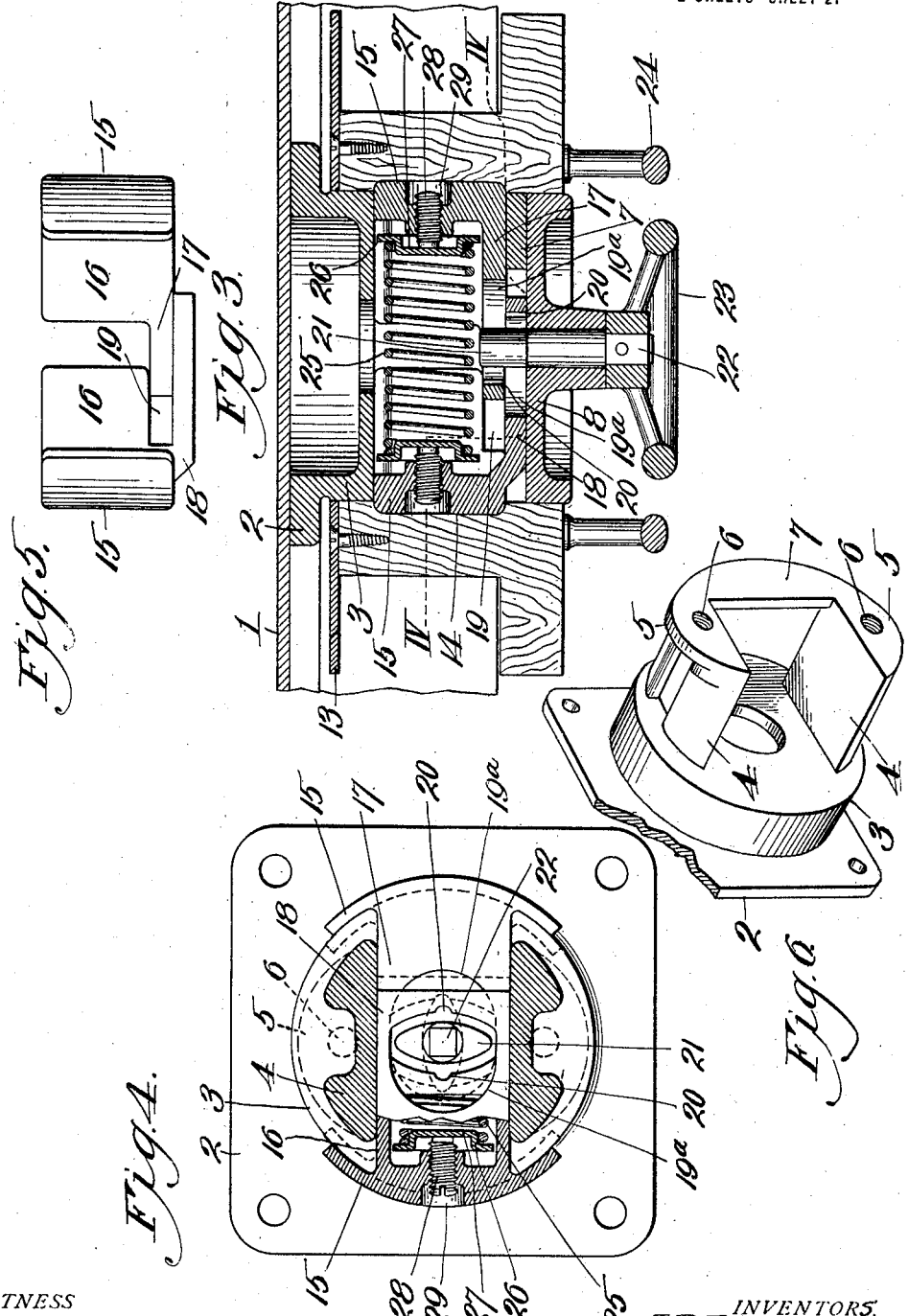
WITNESS
INVENTORS.
J. R. Evans and
F. H. G. Brandt.
BY
ATTORNEY

UNITED STATES PATENT OFFICE.

JOHN R. EVANS AND FOKKO H. G. BRANDT, OF KANSAS CITY, KANSAS, ASSIGNORS, BY MESNE ASSIGNMENTS, TO KANSAS CITY AUTOMATIC HAY PRESS COMPANY.

TENSION-SPOOL.

1,333,069.  Specification of Letters Patent.  Patented Mar. 9, 1920.

Application filed November 25, 1916. Serial No. 133,826. Renewed September 19, 1919. Serial No. 324,991.

*To all whom it may concern:*

Be it known that we, JOHN R. EVANS and FOKKO H. G. BRANDT, citizens, respectively, of the United States and Germany, and residing at Kansas City, in the county of Wyandotte and State of Kansas, have invented certain new and useful Improvements in Tension-Spools, of which the following is a specification.

This invention relates to tension spools and more especially to a spool for paying out wire for tying bales of hay and the like. The object is to produce a simple, strong, durable and compact tension spool which can be easily and quickly placed in or removed from position and which will not overrun in its unwinding operation.

Another object is to produce a spool comprising a mounting, a spool member for holding wire, twine or the like, and a member for retaining the spool in position on the mounting and for yieldingly resisting rotation of the spool in order to guard against overrunning action of the same.

With the objects named in view, the invention consists in certain novel and peculiar features of construction and combinations of parts as hereinafter described and pointed out in the appended claims, and in order that it may be fully understood, reference is to be had to the accompanying drawings, in which,—

Figure 1, is a side view of a tension spool embodying the invention, shown as mounted at the side of a support, such as a baling press.

Fig. 2, is a vertical section on the line II—II of Fig. 1.

Fig. 3, is a horizontal section taken on the line III—III of Fig. 1.

Fig. 4, is a vertical section taken on the irregular line IV—IV of Fig. 3.

Fig. 5, is a detailed top view of a pair of friction shoes constituting a part of the tension spool.

Fig. 6, is a detailed perspective view showing a part of the mounting for the spool.

In the said drawings, 1 indicates the side of a baling press case or other support for the spool, and adapted to be bolted to said support is a mounting constructed as follows:

2 is a perforated base through which securing bolts will be fitted to secure the mounting in position, and formed integral with said base is a cylindrical portion 3, provided with a pair of diametrically opposite outwardly projecting arms 4, the inner faces of said arms being parallel to constitute guides. At their outer ends the arms are provided with lugs 5 provided with tapped or threaded holes 6 and at one side the outer ends of the arms are connected by a vertical bridge piece 7.

8 is a circular head or disk of the same diameter as the cylindrical portion 3 of the mounting, and said head is secured rigidly against the outer face of the arms 4 by stud bolts 9 secured in the tapped holes 6, and nuts 10 engaging the outer ends of said bolts. The head or disk constitutes in conjunction with the cylindrical portion 3, the mounting for a spool 11, which is shown as composed of a body portion 12 of wood and a metal flange 13, and said spool is formed with an internal circular channel 14.

15 indicates a pair of segmental friction shoes whose outer surfaces are struck from the same radius as the internal channel of the spool and said shoes are of width to fit snugly in said channel and thereby guard against the spool working off the mounting. Each shoe is provided with a pair of inwardly projecting arms 16, which respectively engage the parallel inner faces of the guide arms 4. One of the shoes is also provided with a vertical wall 17, at the outer edges of its arms 16, and projecting beyond the inner ends of such arms. The other shoe is provided with a forwardly-offset wall 18 to fit against the outer side of wall 17 and to provide a slot 19 for the reception of the projecting end of wall 17. The overlapping walls 17 and 18 are provided with registering openings 19$^a$ and at opposite sides or ends said openings communicate with small recesses 20 in said walls, the recesses being disposed in the same horizontal plane but at opposite sides of the axis of the spool and mounting and occupying said openings 19$^a$ is an elliptic cam 21 mounted or formed on the inner end of a shaft 22 journaled in the head or disk 8. Secured rigidly on the outer end of shaft 22, is a hand wheel 23 whereby the elliptic cam may be caused to turn from a vertical to a horizontal position and vice versa, the said cam in turning applying pressure simultaneously on the walls 17 and 18 of the shoes for the purpose of imparting endwise approaching movement thereto and thereby withdrawing the shoes from the internal channel of the spool so that the latter may be slipped off the mounting, the spool being equipped with a pair of handles 24 for convenience in placing it on or removing it from the mounting.

To effect outward adjustment of the shoes into the internal channel of the spool and not only retain the latter from working off the mounting but restrain it from freedom of rotation or from overrunning, an expansive coiled spring 25 is arranged between the shoes to apply outward pressure thereon, and to make provision for increasing or decreasing the pressure of said spring, the latter bears directly against a pair of circular plates 26, having centering bosses 27 fitting within the spring, and said plates are secured to the inner ends of a pair of screws 28 engaging threaded openings in the shoes 15, the outer faces of the shoes being provided with cavities 29 receiving the outer ends of the screws to give convenient access with a tool to the screws regardless of the position of adjustment of the latter.

When the spool member is to be removed, the operator applies turning pressure on handle 23 and turns the same a one-fourth revolution. In accomplishing this purpose, the opposite ends of the elliptic cam apply pressure on the walls 17 and 18 of the shoes and thereby effect the retraction of the arcuate portions of the shoes from the position shown in Figs. 3 and 4 to the position shown in dotted lines in the last-named figure, that is to say, he withdraws the shoes until their outer faces are flush with or slightly inward of the circumference of the cylindrical portion 3 of the base and the head or disk, and the engagement of the ends of the elliptic cam with the recesses 20 in the walls 17 and 18 prevent the spring 25, compressed by the inward adjustment of the shoes, from reversing such movement. The operator is therefore free to slide the spool member off the mounting.

The spool can be replaced with one charged with wire, not shown, by simply slipping such spool upon the mounting. The operator then turns the handle to trip the elliptic cam from engagement with the recesses 20 and returns said cam to its original position, and as this occurs the spring reacts to force the shoes outward until they enter the internal channel of the spool member. When thus engaged they not only retain the member in position, but offer a yielding resistance to rotation of such member and thus guard against the spool unwinding with sufficient rapidity to slacken the wire or twine being unwound from it.

From the above description it will be apparent that we have produced a tension spool possessing the features of advantage enumerated as desirable in the statement of invention, and we wish it to be understood that while we have illustrated and described the preferred embodiment of the invention, we do not wish to be restricted to the exact details of construction and organization shown and described but reserve the right to make all changes falling within the spirit and scope of the appended claims.

We claim:—

1. A tension spool support, a spool member rotatable thereon, a pair of friction shoes slidable on said support and provided with recesses, yielding means holding said shoes clamped against the inner side of said spool member, and means to withdraw the shoes from engagement with the spool member and engage said recesses to be held thereby against accidental movement.

2. A tension spool support, a spool member rotatable thereon, a pair of friction shoes slidable on said support, yielding means holding said shoes clamped against the inner side of said spool member, an elliptic cam carried by the journal support, and means to turn said cam and cause it to apply pressure upon the friction shoes to withdraw the same from engagement with said spool member; said friction shoes having opposite recesses for respectively receiving the ends of the elliptic cam to prevent accidental rotative movement thereof and prevent the spring from moving the friction shoes outward.

3. A tension spool support, a spool member rotatable thereon and provided with an internal circular channel, a friction shoe slidable on said journal support, a spring for imparting outward sliding movement to the shoe to cause the same to engage the said spool member within the said channel thereof, and means to impart inward sliding movement to the shoe to overcome the resistance of said spring and withdraw the shoe from said channel of the spool member.

4. A tension spool support, a spool member rotatable thereon and provided with an internal circular channel, a pair of friction shoes mounted slidingly on said support, an expansion spring arranged between and bearing outwardly on said shoes to cause the same to enter the said channel of the spool member to retain the same against lateral movement on its journal support and to yieldingly resist rotative movement of said spool member, and means to impart simultaneous inward movement to said shoes to withdraw the same from the said channel of the spool member.

5. A tension spool support, comprising a cylindrical portion, arms projecting outward therefrom and having parallel inner faces, a circular head secured against the outer ends of said arms with its axis alined with the axis of the said cylindrical portion, a spool member journaled on said cylindrical portion and head and provided with an internal circular channel, a pair of segmental friction shoes provided with inwardly projecting parallel arms engaging the parallel faces of said first-named arms, an expansion spring arranged between and applying outward pressure on the friction shoes to dispose them in the channel of said spool member and yieldingly against the latter, and means journaled in the said head for imparting simultaneous inward movement to said shoes to withdraw the same from engagement with the spool member and out of the said channel thereof.

6. A tension spool support comprising a cylindrical portion, arms projecting outwardly therefrom and having parallel inner faces, a circular head secured against the outer ends of said arms with its axis alined with the axis of the said cylindrical portion, a spool member journaled on said cylindrical portion and head and provided with an internal circular channel, a pair of segmental friction shoes provided with inwardly projecting parallel arms engaging the parallel faces of said first-named arms, and also provided with a pair of parallel overlapping walls having registering openings, a shaft journaled in said head and provided with an elliptic cam within said openings and adapted when turned to simultaneously engage said walls and force the shoes inward until withdrawn from the channel of said spool.

7. A tension spool support comprising a cylindrical portion, arms projecting outwardly therefrom and having parallel inner faces, a circular head secured against the outer ends of said arms with its axis alined with the axis of the said cylindrical portion, a spool member journaled on said cylindrical portion and head and provided with an internal circular channel, a pair of segmental friction shoes provided with inwardly projecting parallel arms engaging the parallel faces of said first-named arms, and also provided with a pair of parallel overlapping walls having registering openings and horizontally alined recesses communicating with said openings, a shaft journaled in said head and provided with an elliptic cam standing in said openings, and a handle to turn the shaft and cause the cam to respectively engage the said walls at opposite ends of said openings, and impart inward movement to the shoes until the ends of the cam respectively engage said recesses.

8. In a tension spool support, a member comprising a cylindrical portion, arms projecting forwardly therefrom provided with parallel inner faces, a circular head secured to the front ends of said arms and disposed concentrically with respect to said cylindrical portion, a pair of segmental friction shoes fitting slidingly between said arms, an expansion spring for imparting outward sliding movement to said shoes until their circumferential faces are disposed outward of the circumferential faces of said cylindrical portion and head, and means for imparting simultaneous inward movement to said shoes until their circumferential faces are substantially flush with the circumferential faces of said cylindrical portion and head.

In testimony whereof we affix our signatures in the presence of two witnesses.

JOHN R. EVANS.
FOKKO H. G. BRANDT.

Witnesses:
M. C. BOHN,
G. Y. THORPE.